(12) United States Patent
Yu et al.

(10) Patent No.: US 12,500,629 B2
(45) Date of Patent: Dec. 16, 2025

(54) METHOD AND APPARATUS FOR TIERED CHANNEL STATE INFORMATION FEEDBACK IN MOBILE COMMUNICATIONS

(71) Applicant: MediaTek Inc., Hsinchu (TW)

(72) Inventors: Chia-Hao Yu, Hsinchu (TW); Tzu-Han Chou, San Jose, CA (US); Jiann-Ching Guey, Hsinchu (TW); Chin-Kuo Jao, Hsinchu (TW); Parisa Cheraghi, San Jose, CA (US); Chun-Chia Tsai, Hsinchu (TW)

(73) Assignee: MediaTek Inc. (TW)

( * ) Notice: Subject to any disclaimer, the term of this patent is extended or adjusted under 35 U.S.C. 154(b) by 21 days.

(21) Appl. No.: 18/440,998

(22) Filed: Feb. 14, 2024

(65) Prior Publication Data
US 2024/0283493 A1 Aug. 22, 2024

Related U.S. Application Data

(60) Provisional application No. 63/485,936, filed on Feb. 20, 2023.

(51) Int. Cl.
*H04L 1/02* (2006.01)
*H04B 7/0417* (2017.01)
*H04B 7/0452* (2017.01)

(52) U.S. Cl.
CPC ......... *H04B 7/0417* (2013.01); *H04B 7/0452* (2013.01)

(58) Field of Classification Search
CPC .. H04B 7/0626; H04B 7/0842; H04B 7/0417; H04B 7/0452; H04B 7/063; H04L 5/0048; H04L 1/0026; H04L 5/0057; H04W 52/241; H04W 52/243
USPC .................. 375/267, 260, 298, 299; 370/252
See application file for complete search history.

(56) References Cited

U.S. PATENT DOCUMENTS

| | | | |
|---|---|---|---|
| 2010/0226269 A1* | 9/2010 | Chakraborty | H04L 5/0094 370/252 |
| 2013/0078919 A1* | 3/2013 | Kubono | H04B 5/22 455/41.1 |
| 2013/0148515 A1* | 6/2013 | Ribeiro | H04L 5/0094 370/252 |
| 2015/0304010 A1* | 10/2015 | Zhang | H04L 5/005 370/329 |
| 2022/0029681 A1* | 1/2022 | Zhu | H04B 7/0842 |
| 2024/0031109 A1* | 1/2024 | Hao | H04L 5/0048 |
| 2024/0388401 A1* | 11/2024 | Ibrahim | H04B 7/0626 |
| 2025/0055651 A1* | 2/2025 | Ly | H04B 7/0632 |

* cited by examiner

*Primary Examiner* — Khai Tran
(74) *Attorney, Agent, or Firm* — Andy M. Han; Han IP PLLC (57) ABSTRACT

Various solutions for tiered channel information feedback with respect to user equipment and network apparatus in mobile communications are described. An apparatus may determine a first tier channel state information (CSI) based on a first reference signal resource measurement. The apparatus may report the first tier CSI to a network node. The apparatus may determine a second tier CSI based on the first tier CSI and based on a second reference signal resource measurement. The apparatus may report the second tier CSI to the network node. The second tier CSI may be different from the first tier CSI.

16 Claims, 9 Drawing Sheets

METHOD AND APPARATUS FOR TIERED CHANNEL STATE INFORMATION FEEDBACK IN MOBILE COMMUNICATIONS

CROSS REFERENCE TO RELATED PATENT APPLICATION(S)

The present disclosure is part of a non-provisional application claiming the priority benefit of U.S. Patent Application No. 63/485,936, filed 20 Feb. 2023, the content of which herein being incorporated by reference in its entirety.

TECHNICAL FIELD

The present disclosure is generally related to mobile communications and, more particularly, to tiered channel state information (CSI) feedback framework with respect to user equipment (UE) and network apparatus in mobile communications.

BACKGROUND

Unless otherwise indicated herein, approaches described in this section are not prior art to the claims listed below and are not admitted as prior art by inclusion in this section.

Channel State Information Reference Signal (CSI-RS) is a reference signal (RS) that is used in the downlink (DL) direction in 5G NR, for the purpose of channel sounding and used to measure the characteristics of a radio channel so that it can use correct modulation, code rate, precoder, beam forming etc. UEs will use these reference signals to measure the quality of the DL channel and report this in the uplink (UL) through the CSI reports. The network node sends CSI-RSs for measuring channel status information such as CSI-Reference Signal Receiving Power (RSRP), CSI-Reference Signal Receiving Quality (RSRQ) and CSI-Signal to Interference plus Noise Ratio (SINR) for mobility procedures. Specific instances of CSI-RSs can be configured for time/frequency tracking and mobility measurements.

CSI feedback is the way of indicating certain reports by the UE to the network for indicating channel parameters for, e.g., dynamic scheduling purpose. CSI parameters are the quantities related to the state of a channel. The UE reports CSI parameters to the network node (e.g., gNB) as feedback. The CSI feedback includes several parameters, such as the Channel Quality Indicator (CQI), the Precoding Matrix Indicator (PMI) with different codebook sets and the Rank Indicator (RI). The CSI feedback may also include parameters for indicating a CSI-RS resource (or CSI-RS resource set) based on which the CQI, PMI and RI are derived and reported. The UE uses the CSI-RS to measure and determine the CSI feedback. Upon receiving the CSI parameters, the network node can schedule downlink data transmissions (e.g., modulation scheme, code rate, number of transmission layers and MIMO precoding) accordingly.

In current NR CSI framework, the UE feeds back the UE preferred precoders for CSI feedback. Current CSI report considers a single transmission/reception point (TRP)-UE signal channel. Each UE reports a preferred precoder observed by the UE. The reported precoder may not reflect real channel status and does not consider the interference from transmissions for other UEs. This may be suitable for Single-User Multiple-Input Multiple-Output (SU-MIMO) scenarios where inter-user interference is not a major concern. However, this is not a preferred solution for Multiple-User Multiple-Input Multiple-Output (MU-MIMO) scenarios. The network node may not determine proper precoders and thus is not able to manage the interferences among multiple UEs. Therefore, in addition to reporting the UE preferred precoders, the UE may also report feedback real/proper channel information for channel and interference management. The UE may perform direct channel feedback by reporting channel matrix or channel covariance matrix to the network.

As number of transmit antennas is increased in the massive MIMO system, the overhead will increase dramatically given a same level of CSI resolution. Accordingly, how to feedback channel information effectively and adaptively becomes an important issue in the newly developed wireless communication network. Therefore, there is a need to provide proper schemes to perform CSI compression and reporting.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to tiered CSI feedback framework with respect to user equipment and network apparatus in mobile communications.

In one aspect, a method may involve an apparatus determining a first tier CSI based on a first reference signal resource measurement. The method may involve the apparatus reporting the first tier CSI to a network node. The method may also involve the apparatus determining a second tier CSI based on the first tier CSI and based on a second reference signal resource measurement. The method may involve the apparatus reporting the second tier CSI to the network node. The second tier CSI may be different from the first tier CSI.

In one aspect, an apparatus may comprise a transceiver which, during operation, wirelessly communicates with at least one network node. The apparatus may also comprise a processor communicatively coupled to the transceiver. The processor, during operation, may perform operations comprising determining a first tier CSI based on a first reference signal resource measurement. The processor may perform operations comprising reporting, via the transceiver, the first tier CSI to the network node. The processor may also perform operations comprising determining a second tier CSI based on the first tier CSI and based on a second reference signal resource measurement. The processor may perform operations comprising reporting, via the transceiver, the second tier CSI to the network node. The second tier CSI may be different from the first tier CSI.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), Industrial Internet of Things (IIoT), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to tiered CSI feedback framework with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

Generally, channel information feedback may be in the form of channel information state (CSI) feedback or direct channel feedback. The CSI feedback may comprise at least one of a PMI including index of a precoder from a codebook, an RI including a number of supported transmission layers, and a CQI including an indicator of mutual information in terms of supported MCS, given PMI and RI. The direct channel feedback may comprise at least one of an abstraction of channel matrix or channel covariance matrix. The direct channel feedback may further include a metric for deriving/indicating CQI under certain interference and/or PMI and RI hypothesis.

In 3rd Generation Partnership Project (3GPP) NR, several types of precoder codebooks are defined to accommodate different requirements of CSI resolution and overheads. For example, 3GPP NR Type-I codebook defines that the UE may feedback one of 1 dimensional (1D)/2D discrete Fourier transform (DFT) beamformer(s) that best matches to the measured DL channel. 3GPP NR Type-II codebook defines that the UE may feedback linear combination coefficients of selected 1D/2D DFT beams (or, bases) to form a precoder. The Type-II codebook has higher CSI resolution compared to the Type-I codebook while the overhead is also increased. 3GPP NR eType-II codebook defines an enhanced version of the Type-II codebook that also uses frequency domain DFT basis to efficiently compress across frequency subbands. With Orthogonal Frequency Division Multiple (OFDM), channel estimation, CSI computation and reporting are typically independent in every frequency unit (e.g., frequency subband). A subband may consist of $N_{PRB}^{SB}$ contiguous Physical Resource Blocks (PRBs) and depend on a total number of PRBs in the bandwidth part.

Figure 1:
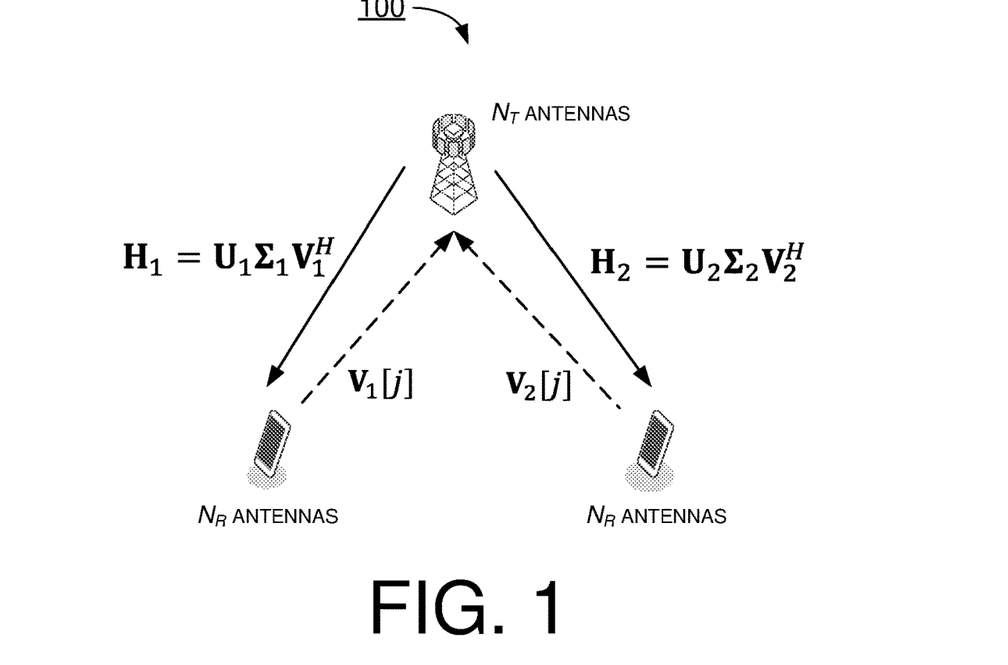
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves at least one network node and a plurality of UEs, which may be a part of a wireless communication network (e.g., an LTE network, a 5G/NR network, an IoT network or a 6G network). Scenario 100 illustrates the current NR CSI framework. A plurality of UEs (e.g., UE 1 and UE 2) may connect to the network side. The network side may comprise one or more than one network nodes. The network node may transmit the CSI-RS to the UE(s) via $N_T$ antennas. Each UE may acquire the channel information between itself and the network node by measuring the CSI-RS via $N_R$ antennas and transmit corresponding CSI feedback to the network node. For elaboration purpose, it is assumed a narrowband system where the channel information between a NW node and a UE is described by a $N_R \times N_T$ matrix. It can be extended to a wideband system model with the consideration of a plurality of subbands. Let H denote the channel information between the UE and the network node. H can be represented by singular value decomposition $H=U\Sigma V^H$, where U denotes a left eigenvector matrix which may be utilized at receiver side for signal reception, E denotes a diagonal eigenvalue matrix (e.g., representing independent subchannel gains), and V denotes a right eigenvector matrix which may be utilized for precoding at transmitter side. $H_1$ represents the channel information between the UE 1 and the network node. $H_2$ represents the channel information between the UE 2 and the network node. In current NR CSI reporting scheme, the UE reports a preferred precoding matrix (e.g., $V_1[j]$ or $V_2[j]$) to the network node based on a rank assumption where the rank assumption may be reported in a rank indication. However, the reported preferred precoding matrix may not represent the real/whole channel information (e.g., $H_1$ or $H_2$) between the network node and the UEs.

Figure 2:
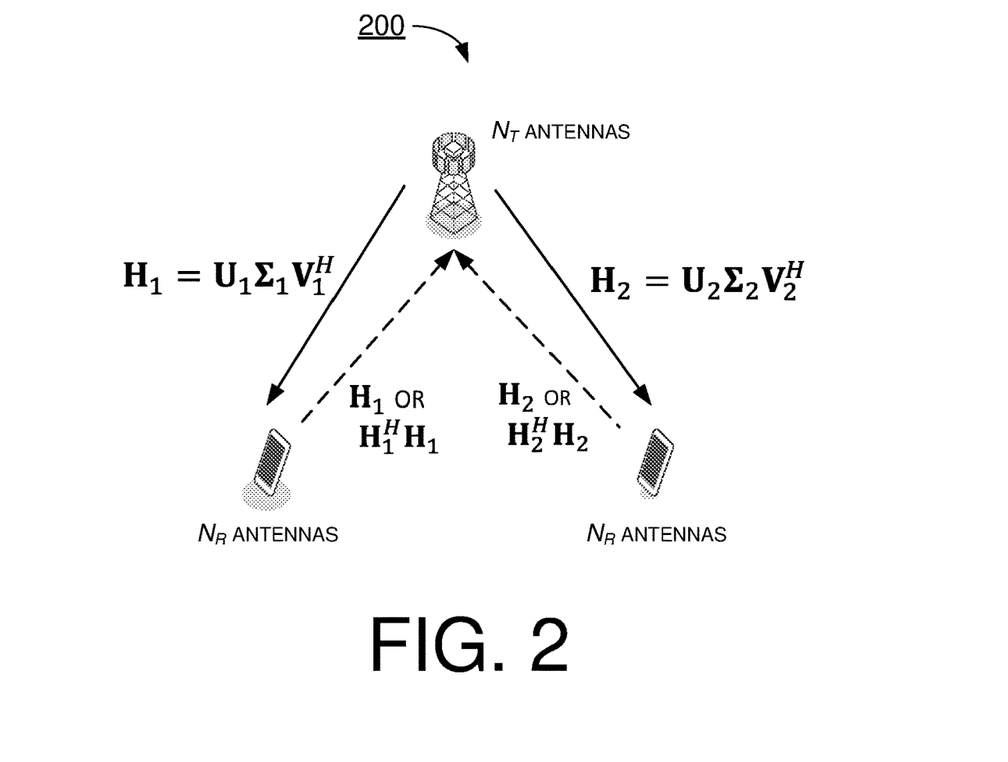
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves at least one network node, and one or a plurality of UEs, which may be a part of a wireless communication network (e.g., an LTE network, a 5G/NR network, an IoT network or a 6G network). Scenario 200 illustrates a novel CSI reporting scheme according to proposed schemes of the present disclosure. Instead of reporting the preferred precoding matrix, the UE may be configured to report the whole channel information to the network side. The channel information may comprise H or $H^H H$, where the operator "$^H$" denotes Hermitian transpose, i.e., conjugate transpose of a matrix. The UE 1 may report the channel information (e.g., $H_1$ or $H_1^H H_1$) between the UE 1 and the network node. The UE 2 may report the channel information (e.g., $H_2$ or $H_2^H H_2$) between the UE 2 and the network node. In distributed MIMO scenarios, the network side antenna ports jointly serving a UE can be geographically separated. Compared with a traditional scenario where a specific UE is served by one network node, in distributed MIMO scenario the specific UE may be served by more than one network nodes. In a case that some network nodes are simultaneously serving a few UEs in same resources in distributed MIMO setup, inter-user interference appears. To manage such inter-user interference properly, the knowledge of the channel information between associated network nodes and associated UEs is very beneficial. Essentially, full channel information enables better joint precoder design so that the inter-user interference links are transformed into signal links. Though challenging, coherent Joint Transmission (CJT) scheme is a technique allowing to realize the benefit described above in the distributed MIMO scenario. Accordingly, with comprehensive channel information between network nodes and UEs, the network nodes may be able to well schedule data transmissions and manage interferences among UEs.

In order to enable interference management capability at the network side, the channel information fed back from the UE can be implemented by feeding back the information related to H or $H^H H$. For example, the UE may feedback right eigenvectors and eigenvalues based on Singular Value Decomposition (SVD) of H. Equivalently, the UE may also feedback the eigenvectors and eigenvalues based on Eigen Value Decomposition (EVD) of $H^H H$. The network node can derive the channel information based on the reported information related to H or $H^H H$. Consequently, the network node can acquire the channel information of all UEs. The network node may optimize the precoders (e.g., better orthogonality) to minimize the interferences for MU-MIMO scenarios accordingly.

As number of transmit antennas is increased in the massive MIMO system, the overhead will increase dramatically given a same level of CSI resolution. In the present disclosure, a CSI compression based on a multi-tier processing and reporting scheme is proposed. The channel information for feeding back to the network node may be classified into multiple tiers. Long-term channel statistics may be acquired into the tier with long reporting periodicity. Short-term channel statistics may be acquired into the tier with short reporting periodicity. The UE may report different tiers of channel statistics to the network node with different periodicities. Thus, the signal overhead for reporting channel information may be reduced and distributed. The channel information reporting schemes and radio resource efficiency will be improved.

Figure 3:
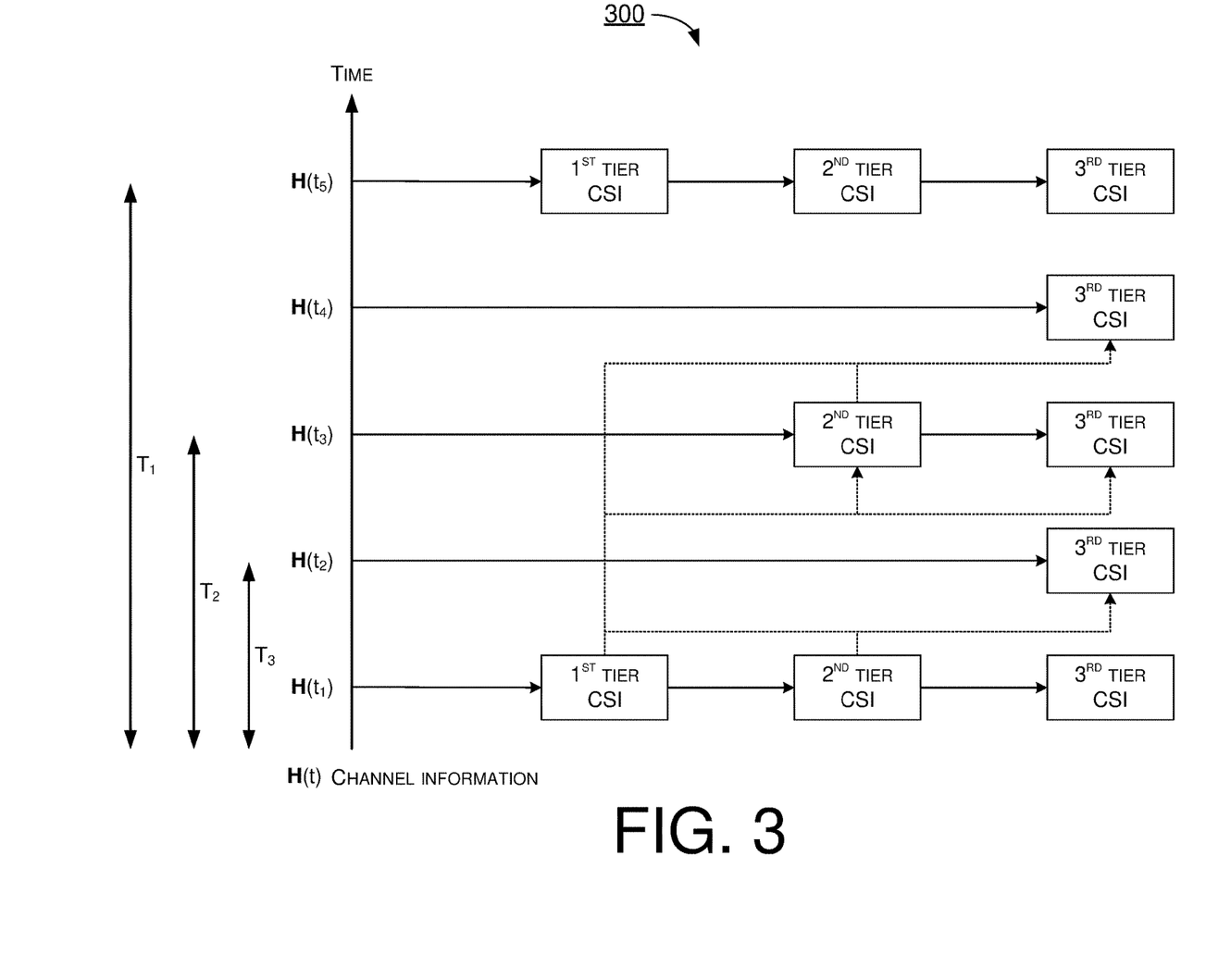
FIG. 3 is a diagram depicting example tiered CSI reporting schemes in accordance with implementations of the present disclosure.

FIG. 3 illustrates an example scenario 300 under schemes in accordance with implementations of the present disclosure. Scenario 300 involves at least one network node and one or more UEs, which may be a part of a wireless communication network (e.g., an LTE network, a 5G/NR network, an IoT network or a 6G network). Scenario 300 illustrates the tiered channel information feedback framework. The UE may measure the reference signal resource (e.g., CSI-RS) and determine/calculate channel information H(t) (e.g., channel matrix). The channel information (e.g., CSI) may be classified/divided into multiple tiers (e.g., 3 tiers). A first tier channel information may be calculated with long periodicity (e.g., $T_1$) which is derived based on channel information (e.g., reference signal resource measurement) and provide parameters abstracting long-term channel statistics. A second tier channel information may be calculated with shorter or equal periodicity (e.g., $T_2$) than the first tier channel information periodicity (i.e., $T_2 \le T_1$). The second tier channel information may be derived based on the previous first tier channel information and latest channel information (e.g., reference signal resource measurement), and provide parameters abstracting mid-term channel statistics. A third tier channel information may be calculated with shorter or equal periodicity (e.g., $T_3$) than the second tier channel information periodicity (i.e., $T_3 \le T_2$). The third channel information may be derived based on the previous first and second tier channel information and latest channel information (e.g., reference signal resource measurement), and provide parameters abstracting short-term channel statistics.

Specifically, at $t_1$, the UE may report all tiers (e.g., $1^{st}$ tier, $2^{nd}$ tier, and $3^{rd}$ tier) channel information to the network node. At $t_2$, the UE may derive the $3^{rd}$ tier channel information based on the $1^{st}$ tier and $2^{nd}$ tier channel information at $t_1$ (i.e., previous $1^{st}$ tier and $2^{nd}$ tier channel information) and the channel information at $t_2$ (i.e., latest channel information). The UE may report only the $3^{rd}$ tier channel information at $t_2$ (i.e., expiration of periodicity $T_3$). At $t_3$, the UE may derive the $2^{nd}$ and $3^{rd}$ tier channel information based on the $1^{st}$ tier channel information at $t_1$ (i.e., previous $1^{st}$ tier channel information) and the channel information at $t_3$ (i.e., latest channel information). The UE may report the $2^{nd}$ and $3^{rd}$ tier channel information at $t_3$ (i.e., expiration of periodicity $T_2$ and $T_3$). At $t_4$, the UE may derive the $3^{rd}$ tier channel information based on the $1^{st}$ tier channel information at $t_1$ (i.e., previous $1^{st}$ tier channel information), the $2^{nd}$ tier channel information at $t_3$ (i.e., previous $2^{nd}$ tier channel information) and the channel information at $t_4$ (i.e., latest channel information). The UE may report only the $3^{rd}$ tier channel information at $t_4$ (i.e., expiration of periodicity $T_3$). At $t_5$, the UE may derive the $1^{st}$, $2^{nd}$ and $3^{rd}$ tier channel information based on the channel information at $t_5$ (i.e., latest channel information). Then, the UE may report all tiers (e.g., $1^{st}$ tier, $2^{nd}$ tier and $3^{rd}$ tier) channel information to the network node at $t_5$ (i.e., expiration of periodicity $T_1$, $T_2$ and $T_3$).

It should be noted that, the periodic update of the $1^{st}$ tier, $2^{nd}$ tier and $3^{rd}$ tier channel information is an example for illustrating the multi-tier channel information reporting scheme. In some implementations, the $1^{st}$ tier, $2^{nd}$ tier and $3^{rd}$ tier channel information may be reported in trigger-based operations. For example, the channel information feedback may be triggered by the network or triggered by the UE. The trigger timing may be determined by the network or the UE. The network or the UE may determine which tier channel information should be reported at a specific time point.

In channel information feedback, the near-optimal precoder for each subband consists of eigen vectors of the channel correlation matrix in the subband. For example, it can be expressed by $H[n]^H H[n]=W[n]\Sigma[n]W^H[n]$. The codebook is such that it approximates the eigen vectors well. For uniform linear antenna array (ULA), weighted linear combinations of DFT vectors can be used to approximate the eigen vectors. For 3GPP NR Type-I codebook, a subband precoder $W[n]$ may be expressed by $W[n]=W_1 W_2[n]$, $n=0, 1, \ldots N_3-1$. $W_1$ denotes frequency independent spatial bases. $W_2[n]$ denotes frequency dependent linear combination coefficients. $N_3$ denotes the number of subbands.

Figure 4:
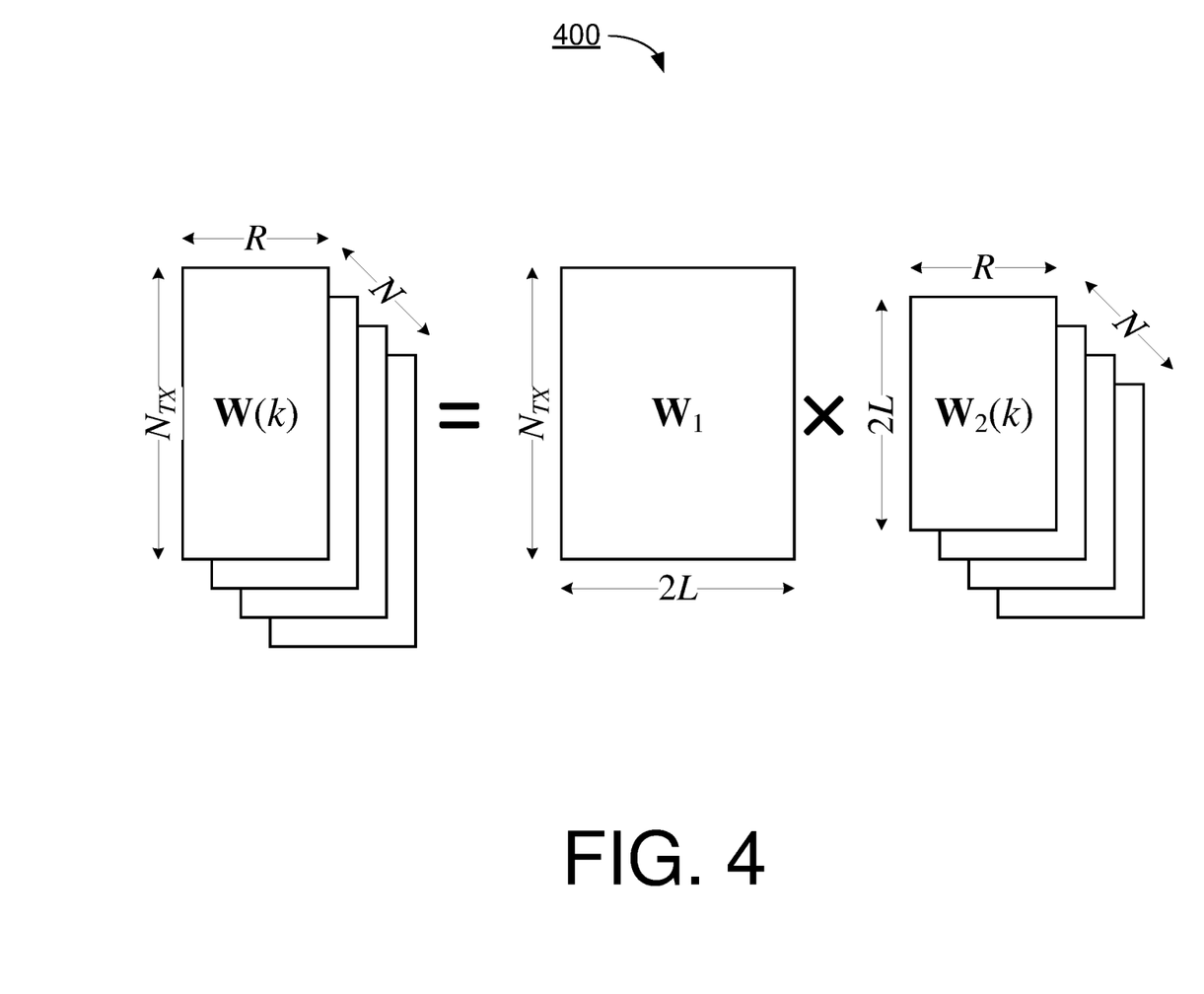
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves at least one network node and one or more UEs, which may be a part of a wireless communication network (e.g., an LTE network, a 5G/NR network, an IoT network or a 6G network). Scenario 400 illustrates an example of channel matrix decomposition method according to proposed schemes of the present disclosure. For Type-I codebook, the UE may determine a preferred precoder per subband. The subband precoder $W[n]$ may be expressed as $W_1$ multiplied by $W_2[n]$ (e.g., $W[n]$ may be projected on the spatial bases $W_1$ with linear combination coefficients $W_2[n]$). $N_{TX}$ denotes the number of antenna ports at the network node (e.g., 32 antenna ports). R denotes the number of layers (e.g., ranks) at the UE (e.g., 4 layers). N denotes the number of frequency subbands. $W_1$ chooses 2L beams out of $N_{TX}$ (e.g., $N_{TX}=N_T$) beams. The UE may down select a number of beams (e.g., 2L=8) with stronger strength from the $N_T$ beams (i.e., compression in spatial domain). 2L beams mean that each of the L antennas may comprise two polarizations (i.e., cross-polarization). These two polarizations are associated to the same spatial bases (e.g., beams). Then, the UE may select one beam per subband and determine the linear combination coefficients (e.g., $W_2[n]$) corresponding to the selected beam. $W_1$ contains oversampled DFT vectors as columns which represent the frequency independent (e.g., wideband) spatial bases (e.g., beams). $W_2[n]$ contains frequency dependent (e.g., subband) coefficients that selects spatial basis from $W_1$ and combines corresponding cross-polarized ports of selected spatial basis. In Type-I codebook CSI feedback, $W_1$ and $W_2[n]$ should be reported/updated together.

The UE may determine $W_1$ with frequency independence and change $W_1$ with longer period. Thus, $W_1$ provides long-term channel characteristics in spatial domain. $W_2[n]$ further selects a spatial basis in $W_1$ and provides co-phasing term between two cross-polarized ports, which varies faster than the spatial bases provided in $W_1$. The UE may determine $W_2[n]$ with frequency dependence and change $W_2[n]$ with shorter period. Thus, $W_2[n]$ provides short-term channel characteristics in spatial domain and frequency domain. Accordingly, since $W_1$ and $W_2[n]$ have variant/different characteristics, they may be reported based on different periodicities. For example, $W_2[n]$ may be reported more frequently than $W_1$.

Figure 5:
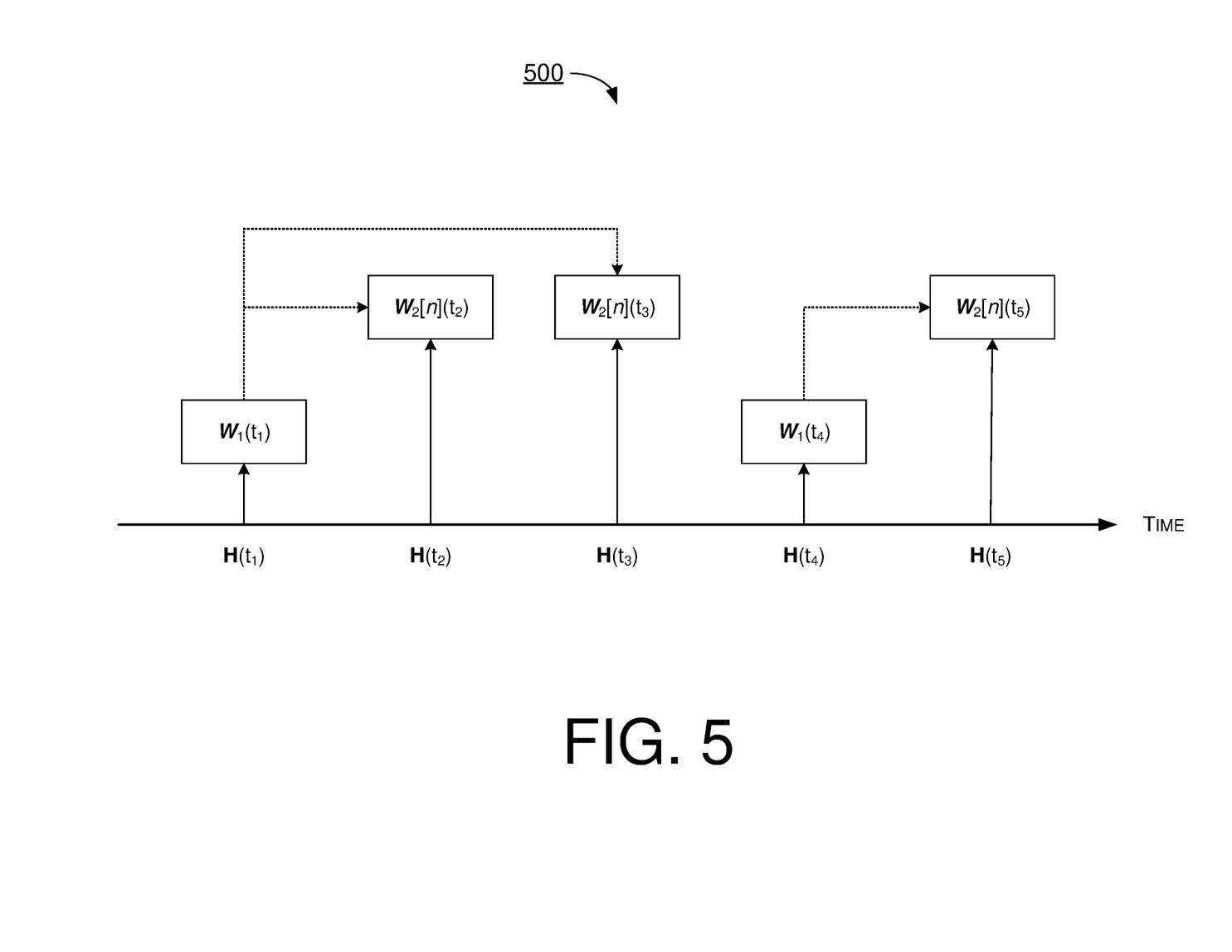
FIG. 5 is a diagram depicting an example tiered CSI reporting schemes in accordance with implementations of the present disclosure.

FIG. 5 illustrates an example scenario 500 under schemes in accordance with implementations of the present disclosure. Scenario 500 involves at least one network node and one or more UEs, which may be a part of a wireless communication network (e.g., an LTE network, a 5G/NR network, an IoT network or a 6G network). Scenario 500 illustrates an example of tiered CSI feedback for Type-I codebook according to proposed schemes of the present disclosure. There is time offset (e.g., $t_2-t_1$) in $W_1$ and $W_2[n]$ calculation. The time offset may be zero. In a case that the time offset is zero, $W_1$ and $W_2[n]$ may be reported/updated at the same time. $W_2[n](t_{3m+i})$ is derived based on $H(t_{3m+i})$ and $W_1(t_{3m+1})$, for i=2 or 3. As shown in FIG. 5, at $t_1$, the UE may determine $W_1(t_1)$ based on $H(t_1)$ and report $W_1(t_1)$ to the network node. At $t_2$, the UE may derive $W_2[n](t_2)$ based on $W_1(t_1)$ and $H(t_2)$ and report $W_2[n](t_2)$ to the network node. At $t_3$, the UE may derive $W_2[n](t_3)$ based on $W_1(t_1)$ and $H(t_3)$ and report $W_2[n](t_3)$ to the network node. $W_2[n](t_2)$ and $W_2[n](t_3)$ should condition on the same $W_1$ since $W_1$ is not changed. At $t_4$, the UE may determine $W_1(t_4)$ based on $H(t_4)$ and report $W_1(t_4)$ to the network node. At $t_5$, the UE may derive $W_2[n](t_5)$ based on $W_1(t_4)$ and $H(t_5)$ and report $W_2[n](t_5)$ to the network node. Accordingly, for Type-I CSI feedback, $W_1$ and $W_2[n]$ can be reported in different periodicities to reduce signaling overhead and improve radio resource efficiency.

For Type-II codebook, similarly, the UE may determine a preferred precoder per subband. The subband precoder $W[n]$ may be expressed as $W_1$ multiplied by $W_2[n]$ (e.g., $W[n]$ may be projected on the spatial bases $W_1$ with linear combination coefficients $W_2[n]$). The difference is that the UE may select more than one spatial bases (e.g., beams) per subband for $W_2[n]$. $W_2[n]$ may contain frequency dependent (e.g., subband) coefficients to combine the selected beams in $W_1$ to synthesize a preferred precoder. The number of beams can be selected may be configured by the network node. The tiered CSI feedback scheme may also be applicable to Type-II codebook reporting.

Figure 6:
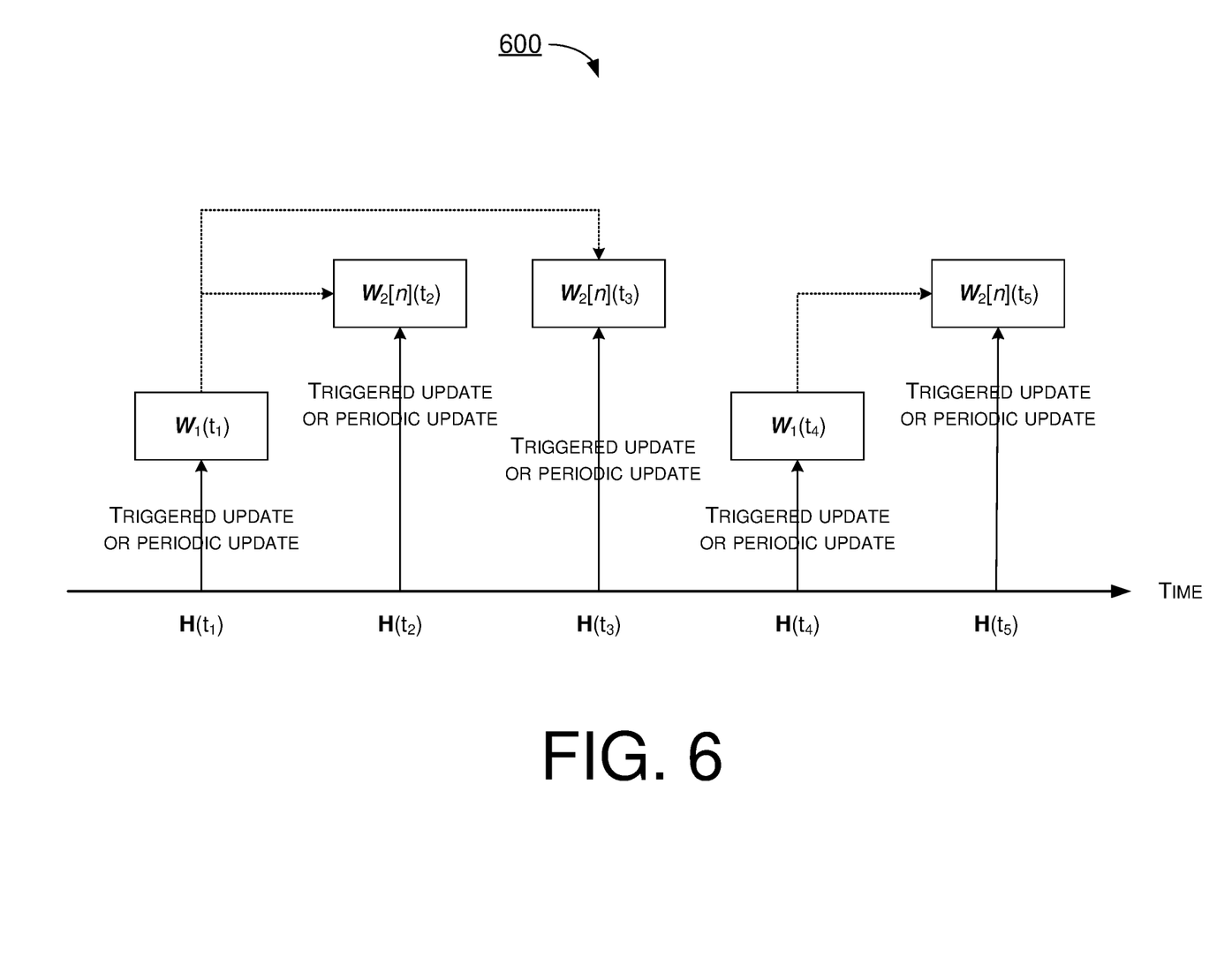
FIG. 6 is a diagram depicting an example tiered CSI reporting schemes in accordance with implementations of the present disclosure.

FIG. 6 illustrates an example scenario 600 under schemes in accordance with implementations of the present disclosure. Scenario 600 involves at least one network node and one or more UEs, which may be a part of a wireless communication network (e.g., an LTE network, a 5G/NR network, an IoT network or a 6G network). Scenario 600 illustrates an example of tiered CSI feedback according to proposed schemes of the present disclosure. The tiered CSI feedback scheme is similar to scenario 500. Moreover, the reporting of $W_1$ and $W_2[n]$ may be periodic initiated or trigger-based initiated. Specifically, the update/reporting of $W_1$ and $W_2[n]$ may be triggered by a control signaling (e.g., downlink control information (DCI)). The control signaling indication should be different for different channel characteristics. For example, the trigger indication for $W_1$ should be different from the trigger indication for $W_2[n]$. In some implementations, CSI feedback of different tiers may be a combination of periodic reporting and trigger-based reporting. For example, $W_1$ may be configured as periodic reporting while $W_2[n]$ may be reported based on trigger signaling. Alternatively, $W_1$ may be reported based on trigger signaling while $W_2[n]$ may be configured as periodic reporting. On the other hand, the trigger-based reporting may be triggered/initiated by the network node or triggered/initiated by the UE itself.

For eType-II codebook, further overhead reduction is needed by compressing the coefficients in $W_2[n]$ in frequency domain. To perform frequency-domain compression, it is necessary to determine the space-frequency precoder for a particular layer across all frequency units (e.g., subbands), as opposed to determine the spatial precoder for a particular subband as in TypeI/TypeII codebook. The UE may determine a preferred precoder for all subbands. The precoder WM may be expressed as W=

$$W_1 W_2^{(l)} W_f^{(l)H} = [s_1 \ \cdots \ s_{N_T}] \begin{bmatrix} c_{1,1}^r & \cdots & c_{N_3,1}^r \\ \vdots & \ddots & \vdots \\ c_{N_T}^r & \cdots & c_{N_3,N_T}^r \end{bmatrix} \begin{bmatrix} f_1^H \\ \vdots \\ f_{N_3}^H \end{bmatrix},$$

where the index l stands for l'th MIMO layer. $W_1$ denotes spatial domain bases for $N_T$ beams. $W_f^{(l)H}$ denotes frequency domain bases for $N_3$ subbands. $W_2^{(l)}$ denotes linear combination coefficients corresponding to spatial domain bases and frequency domain bases (e.g., $c_{1,1}^r$ corresponds to $s_1$ and $f_1^H$). In other words, the precoder WM is projected on spatial domain bases $W_1$ and frequency domain bases $W_f^{(l)H}$. $W_1$ contains oversampled DFT vectors as columns which represent frequency independent (e.g., wideband) spatial bases (e.g., beams). $W_f^{(l)}$ contains frequency domain bases used for frequency domain compression. $W_2^{(l)}$ selects spatial and frequency bases from $W_1$ and $W_f^{(l)}$, and provides linear combination coefficients for synthesizing frequency-dependent precoder based on the selected spatial domain and frequency domain bases. In eType-II codebook CSI feedback, spatial domain and frequency domain bases and corresponding linear combination coefficients in $W_2^{(l)}$ should be reported/updated together.

The UE may perform bases selection and provide corresponding coefficient position with longer period. The coefficient position may indicate the selected spatial domain basis and frequency domain basis. Thus, the long-term channel characteristics may comprise selecting spatial domain/frequency domain bases by providing non-zero coefficient position index in $W_2^{(l)}$. The UE may determine and update linear combination coefficients with shorter period. Thus, the short-term channel characteristics may comprise providing non-zero coefficient values in $W_2^{(l)}$. Accordingly, since the base selection and the linear combination coefficients have variant/different characteristics, they may be reported based on different periodicities. For example, the linear combination coefficients may be reported more frequently than the basis selection.

Figure 7:
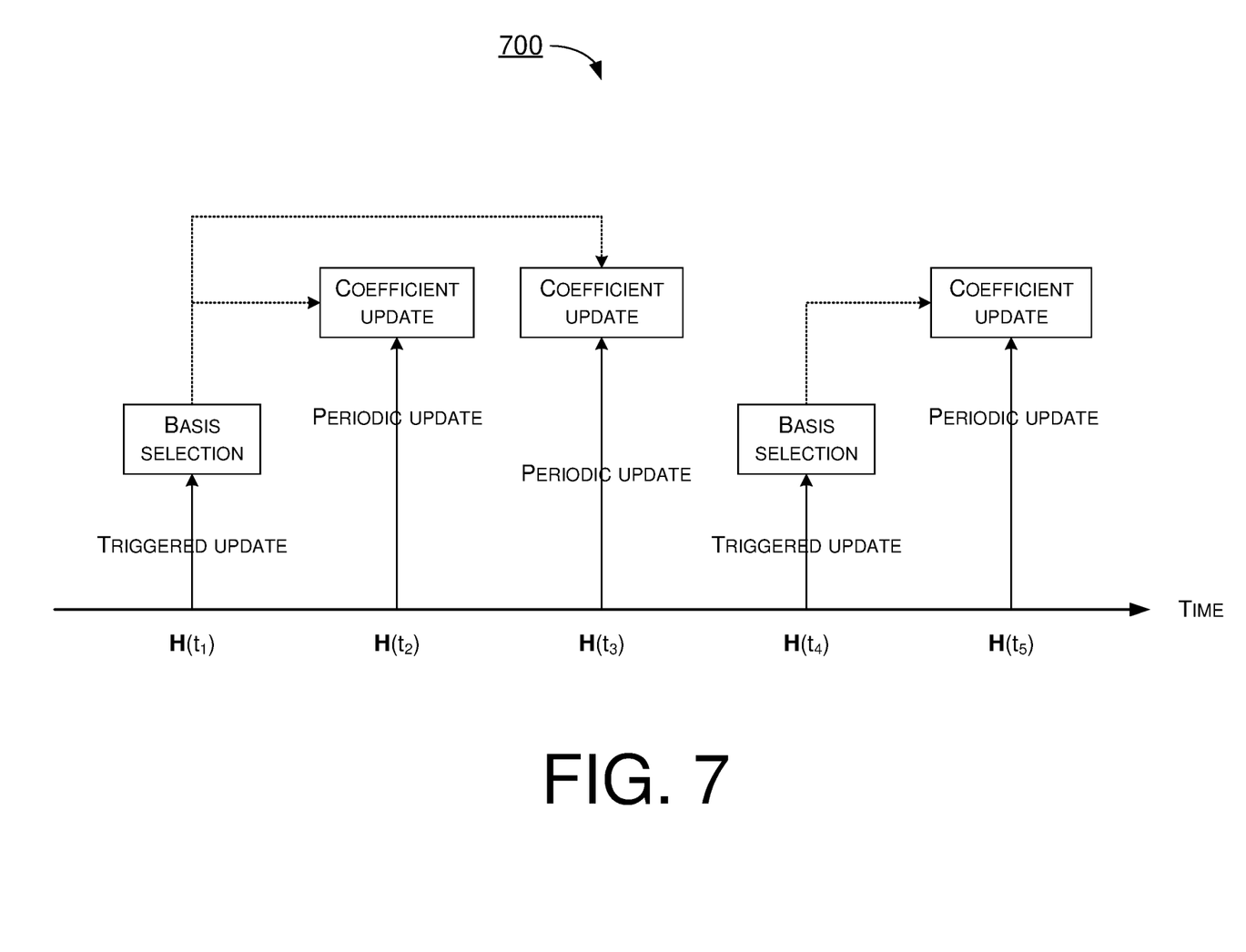
FIG. 7 is a diagram depicting an example tiered CSI reporting schemes in accordance with implementations of the present disclosure.

FIG. 7 illustrates an example scenario 700 under schemes in accordance with implementations of the present disclosure. Scenario 700 involves at least one network node and one or more UEs, which may be a part of a wireless communication network (e.g., an LTE network, a 5G/NR network, an IoT network or a 6G network). Scenario 700 illustrates an example of tiered CSI feedback for eType-II codebook according to proposed schemes of the present disclosure. There is time offset (e.g., $t_2-t_1$) in basis selection and coefficient update. The time offset may be zero. In a case that the time offset is zero, basis selection and coefficient update may be reported/updated at the same time. Coefficient update at $t_{3m+i}$ is derived based on $H(t_{3m+i})$ and basis update at $t_{3m+1}$, for i=2 or 3. The update/reporting may be UE-triggered. For example, the UE may indicate the need for basis update by physical layer signaling (e.g., uplink control information) before granted uplink resource for such update. In some implementations, CSI feedback of different tiers may be a combination of periodic reporting and trigger-based reporting. For example, basis selection may be reported/updated based on trigger signaling and coefficient update may be configured as periodic reporting/update. The UE may further perform compression by only reporting the coefficients with strong value and skip the coefficients if its value is less than a predetermined threshold. Accordingly, in eType-II CSI feedback, the signaling overhead may be further reduced.

With consideration of time drift, time domain correlation should be captured for channel information feedback. Thus, eType-II CSI codebook enhancement further introduces Doppler domain compression. The UE may determine a preferred precoder for spatial domain (SD), frequency domain (FD) and Doppler domain (DD). The precoder may be expressed as $W_1 \tilde{W}_2 (W_f \otimes W_d)^H$, where $W_d$ is composed of DD basis vectors and $\otimes$ stands for Kronecker product. $W_1$ denotes spatial domain bases. $W_f$ denotes frequency domain bases. $W_2$ provides SD/FD/DD basis selection and the weighting coefficients of selection bases for constructing desired precoder. In other words, the precoder is projected on SD bases $W_1$, FD bases $W_f$ and DD bases $W_d$. The expression above provides per layer precoder as in eTypeII compression. $W_1$ contains oversampled DFT vectors as columns which represent frequency independent (e.g., wideband) spatial bases (e.g., beams). $W_f$ contains FD bases used for FD compression. $W_d$ contains DD bases used for DD compression. $W_2$ selects SD/FD/DD bases from $W_1$ and $(W_f \otimes W_d)^H$, and provides linear combination coefficients for synthesizing frequency-dependent precoder based on the selected SD, FD and DD bases. In eType II CSI codebook enhancement, SD/FD/DD basis selection and corresponding linear combination coefficients in $\tilde{W}_2$ should be updated/reported together.

The UE may perform bases selection (e.g., at least one of SD, FD and DD) and provide corresponding coefficient position with longer period. The coefficient position may indicate the selected SD/FD/DD basis. Thus, the long-term channel characteristics may comprise selecting SD/FD or SD/FD/DD bases by providing non-zero coefficient position index in $\tilde{W}_2$. DD may be optional for long-term channel characteristics since it can be updated in short-term channel characteristics as well. The UE may determine and update linear combination coefficients with shorter period. Thus, the short-term channel characteristics may comprise providing DD bases update and non-zero coefficient values in $\tilde{W}_2$. Accordingly, since the base selection and the linear combination coefficients have variant/different characteristics, they may be reported based on different periodicities. For example, the DD basis selection and the linear combination coefficients may be reported more frequently than the SD/FD basis selection.

Figure 8:
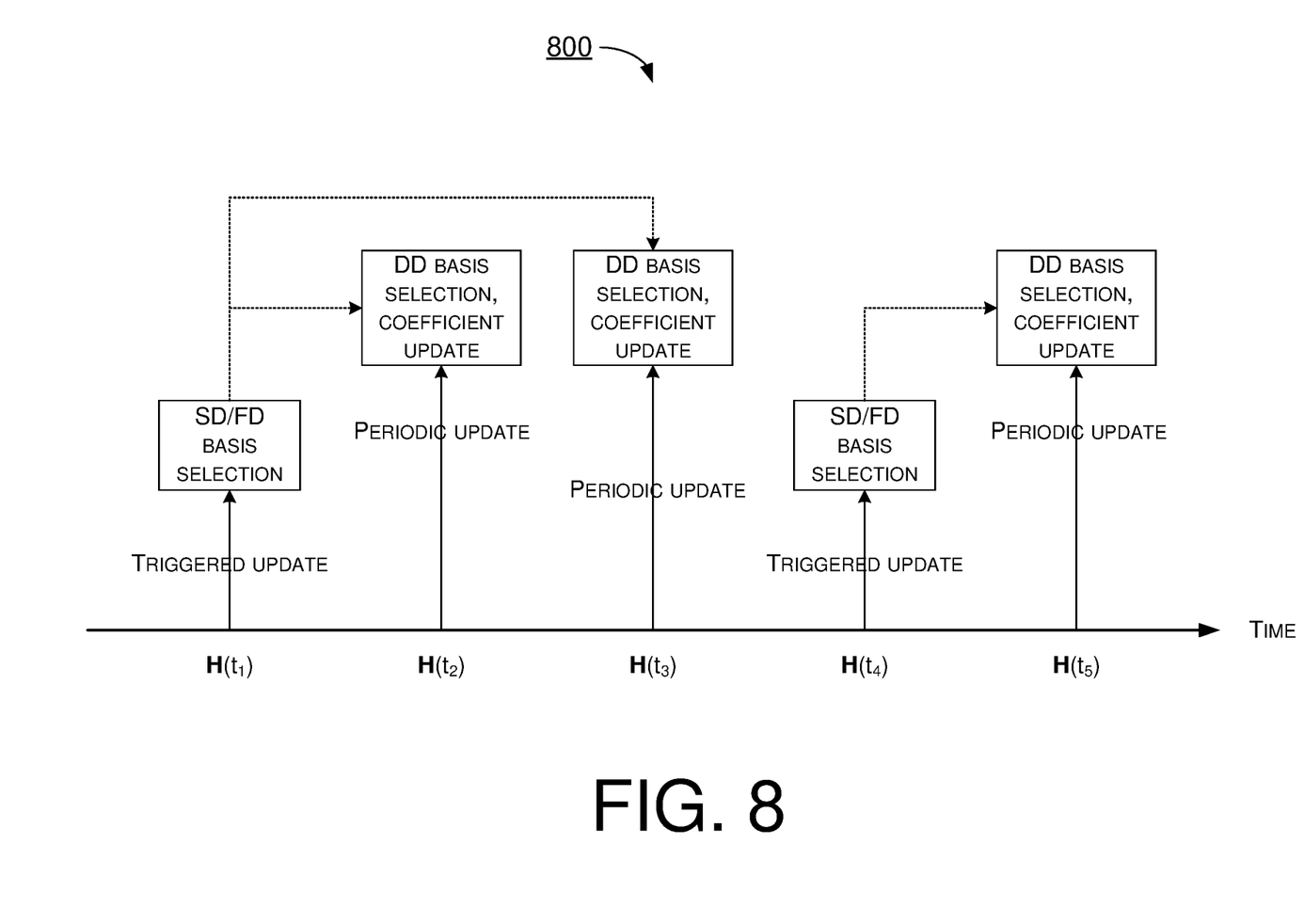
FIG. 8 is a diagram depicting an example tiered CSI reporting schemes in accordance with implementations of the present disclosure.

FIG. 8 illustrates an example scenario 800 under schemes in accordance with implementations of the present disclosure. Scenario 800 involves at least one network node and one or more UEs, which may be a part of a wireless communication network (e.g., an LTE network, a 5G/NR network, an IoT network or a 6G network). Scenario 800 illustrates an example of tiered CSI feedback for eType-II codebook enhancement according to proposed schemes of the present disclosure. There is time offset (e.g., $t_2-t_1$) in in long-term/short-term update calculation. The time offset may be zero. In a case that the time offset is zero, long-term and short-term update may be reported/updated at the same time. Coefficient update at $t_{3m+i}$ is derived based on $H(t_{3m+i})$ and basis update at $t_{3m+1}$), for i=2 or 3. The update/reporting may be UE-triggered. For example, the UE may indicate the need for basis update by physical layer signaling (e.g., uplink control information) before granted uplink resource for such update. In some implementations, CSI feedback of different tiers may be a combination of periodic reporting and trigger-based reporting. For example, long-term update (e.g., SD/FD basis selection) may be reported/updated based on trigger signaling and short-term update (e.g., DD basis selection and coefficient update) may be configured as periodic reporting/update. The UE may further perform compression by only reporting the coefficients with strong value and skip the coefficients if its value is less than a predetermined threshold. Accordingly, in eType-II CSI codebook enhancement feedback, the signaling overhead may be further reduced.

In some implementations, each tier of tiered CSI may provide a subset of full CSI information. Specifically, the tiered CSI feedback scheme is applicable to the feedback/update of wideband and/or subband CQI. For example, $1^{st}$ tier channel information (e.g., long-term channel characteristics) may be used for wideband CQI feedback/update. $2^{nd}$ tier channel information (e.g., short-term channel characteristics) may be used for subband CQI feedback/update. In one example, all subband CQI are reported for all subbands. In another example, a bitmap may be further introduced to indicate which subband(s) need to be updated and $2^{nd}$ tier subband CQI only includes the indicated ones.

In some implementations, the tiered CSI feedback scheme is applicable to the feedback/update of at least one of RI, PMI and CQI per subband or wideband. In one example, $1^{st}$ tier channel information (e.g., long-term channel characteristics) may be used for RI feedback/update. $2^{nd}$ tier channel information (e.g., short-term channel characteristics) may be used for PMI and CQI feedback/update. In another example, $1^{st}$ tier channel information (e.g., long-term channel characteristics) may be used for RI and wideband PMI and CQI feedback/update. $2^{nd}$ tier channel information (e.g., short-term channel characteristics) may be used for subband PMI and subband CQI feedback/update. In yet another example, $1^{st}$ tier channel information (e.g., long-term channel characteristics) may be used for RI feedback/update. $2^{nd}$ tier channel information (e.g., mid-term channel characteristics) may be used for wideband PMI and CQI feedback/update. $3^{rd}$ tier channel information (e.g., short-term channel characteristics) may be used for subband PMI and subband CQI feedback/update.

In some implementations, the tiered CSI feedback scheme is applicable to the feedback/update of Layer Indicator (LI) and/or PMI. For example, an LI may be included together with short-term parameter $W_2$ (e.g., $W_2[n]$ or $W_2^{(l)}$ or $\tilde{W}_2$ in scenarios 500-800). The LI may indicate the strongest layer among the reported ones. In another example, an LI/PMI may be included in $1^{st}$ tier channel information for at least one of SD, FD and DD basis set feedback/update (e.g., $W_1$ and $W_f^{(l)}$ in scenario 700). In some implementations, not all SD/FD/DD basis set may be updated. In some implementations, SD/FD basis set may comprise DFT vectors. In some implementations, SD/FD/DD basis set may be non-orthogonal vector sets. In some implementations, SD/FD/DD basis set may be orthogonal vector sets derived from DFT vectors. In some implementations, an LI/PMI may be included in $2^{nd}$ tier channel information for basis selection of SD/FD/DD (e.g., non-zero coefficient position index of $W_2^{(l)}$ in scenario 700). In some implementations, an LI/PMI may be included in $3^{rd}$ tier channel information for DD basis selection and linear combination coefficients of selected SD/FD (e.g., non-zero coefficient values of $W_2^{(l)}$ in scenario 700). The practical implementation may be a combination of one or more of the above examples/implementations.

In some implementations, each tier of tiered CSI feedback/update may be periodically triggered, semi-persistently triggered or aperiodic triggered. Once activated, it may be triggered periodically. For aperiodic trigger, it may be UE triggered or network triggered (e.g., DCI triggered). The UE may transmit an update request to the network node, and the network node may grant physical resources for the update/reporting. Update request of an early tier of channel information may be piggybacked on a later tier of channel information feedback. The UE may be informed to update certain tier of channel information based on the control signaling received from the network node, e.g., DL control information (DCI). A DCI trigger may include the feedback/update request for one or more tiers of channel information.

In some implementations, the uplink (UL) payload on UL Control Information (UCI) may be adjusted dynamically based on the information which the UE needs to report/update. This may be applicable to all reporting types, e.g., periodically/semi-persistently/aperiodically. For reporting using UL control channel (e.g., physical uplink control channel (PUCCH)), e.g., for periodic reporting, zero-padding may be applied if reported bits are smaller than a designed payload size for a specific PUCCH format. PUCCH format may be selected by the UE based on the UCI payload size. The network node may need to perform blind detection among PUCCH formats. A PUCCH format identifier may be included in the UCI payload (e.g., similar to physical downlink control channel (PDCCH)). For reporting using UL data channel (e.g., physical uplink shared channel (PUSCH)), e.g., for aperiodic reporting, a payload size may be included in the payload itself.

In some implementations, instead of updating/reporting a precoder, the tiered channel information feedback may be applicable to whole channel information update/reporting. As shown in FIG. 2, the UE may be configured to report the whole channel information to the network side (e.g., H or $H^HH$). The UE may use the tiered channel information feedback scheme to update/report the whole channel information. For example, the UE may update/report long-term channel statistics in a $1^{st}$ tier channel information periodicity. The UE may update/report mid-term channel statistics in a $2^{nd}$ tier channel information periodicity. The UE may update/report short-term channel statistics in a $3^{rd}$ tier channel information periodicity. Multi-tier update/reporting with different periodicities may be used based on practical implementations.

Illustrative Implementations

Figure 9:
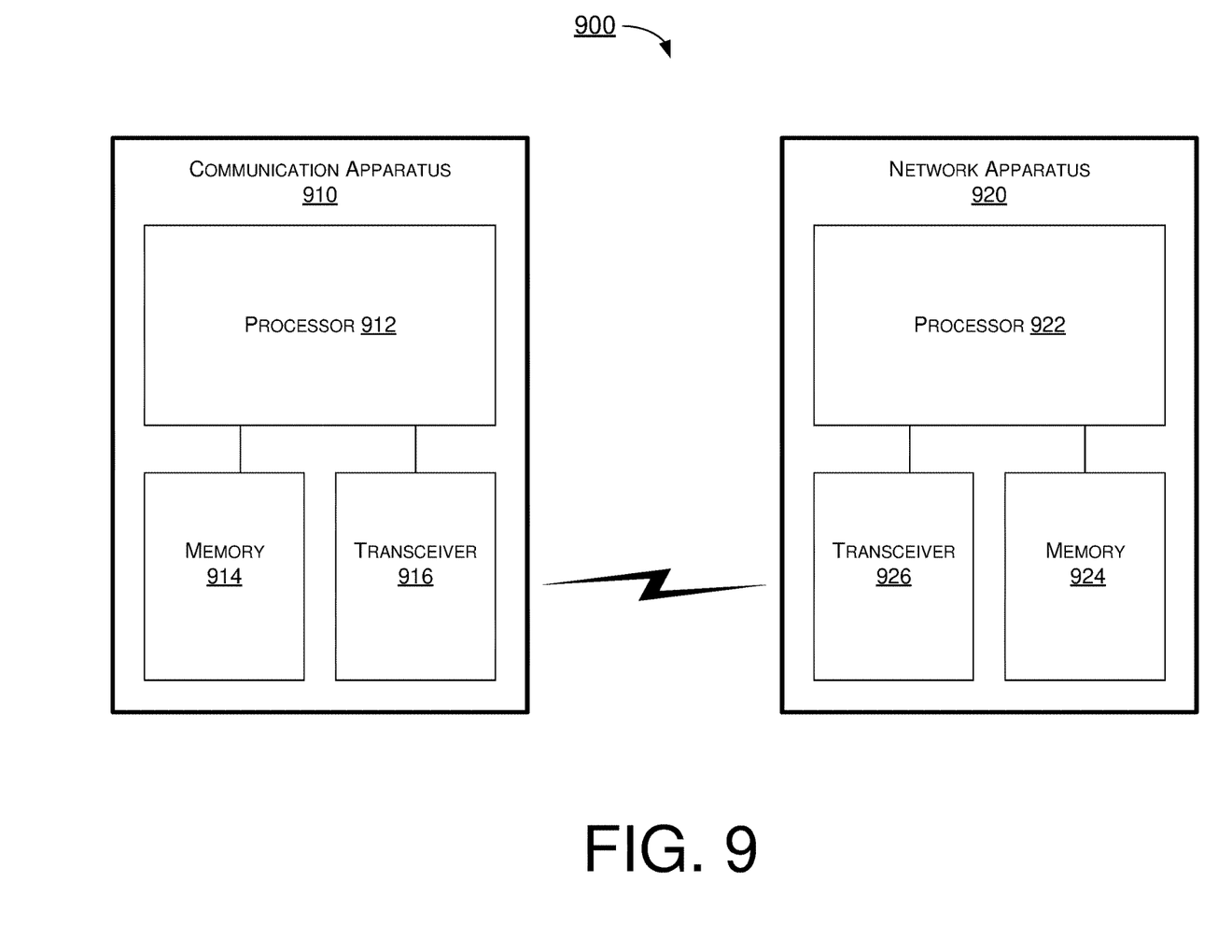
FIG. 9 is a block diagram of an example communication system in accordance with an implementation of the present disclosure.

FIG. 9 illustrates an example communication system 900 having at least an example communication apparatus 910 and an example network apparatus 920 in accordance with an implementation of the present disclosure. Each of communication apparatus 910 and network apparatus 920 may perform various functions to implement schemes, techniques, processes and methods described herein pertaining to tiered CSI feedback framework in mobile communications, including the various schemes described above with respect to various proposed designs, concepts, schemes, systems and methods described above, including scenarios/schemes described above as well as process 1000 described below.

Communication apparatus 910 may be a part of an electronic apparatus, which may be a UE such as a portable or mobile apparatus, a wearable apparatus, a wireless communication apparatus or a computing apparatus. For instance, communication apparatus 910 may be implemented in a smartphone, a smartwatch, a personal digital assistant, a digital camera, or a computing equipment such as a tablet computer, a laptop computer or a notebook computer. Communication apparatus 910 may also be a part of a machine type apparatus, which may be an IoT, NB-IoT, or IIoT apparatus such as an immobile or a stationary apparatus, a home apparatus, a wire communication apparatus or a computing apparatus. For instance, communication apparatus 910 may be implemented in a smart thermostat, a smart fridge, a smart door lock, a wireless speaker or a home control center. Alternatively, communication apparatus 910 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 910 may include at least some of those components shown in FIG. 9 such as a processor 912, for example. Communication apparatus 910 may further include one or more other components not pertinent to the proposed scheme of the present disclosure (e.g., internal power supply, display device and/or user interface device), and, thus, such component(s) of communication apparatus 910 are neither shown in FIG. 9 nor described below in the interest of simplicity and brevity.

Network apparatus 920 may be a part of a network apparatus, which may be a network node such as a satellite, a base station, a small cell, a router or a gateway. For instance, network apparatus 920 may be implemented in an eNodeB in an LTE network, in a gNB in a 5G/NR, IoT, NB-IoT or IIoT network or in a satellite or base station in a 6G network. Alternatively, network apparatus 920 may be implemented in the form of one or more IC chips such as, for example and without limitation, one or more single-core processors, one or more multi-core processors, or one or more RISC or CISC processors. Network apparatus 920 may include at least some of those components shown in FIG. 9 such as a processor 922, for example. Network apparatus 920 may further include one or more other components not pertinent to the proposed scheme of the present disclosure (e.g., internal power supply, display device and/or user interface device), and, thus, such component(s) of network apparatus 920 are neither shown in FIG. 9 nor described below in the interest of simplicity and brevity.

In one aspect, each of processor 912 and processor 922 may be implemented in the form of one or more single-core processors, one or more multi-core processors, or one or more CISC processors. That is, even though a singular term "a processor" is used herein to refer to processor 912 and processor 922, each of processor 912 and processor 922 may include multiple processors in some implementations and a single processor in other implementations in accordance with the present disclosure. In another aspect, each of processor 912 and processor 922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 912 and processor 922 is a special-purpose machine specifically designed, arranged and configured to perform specific tasks including autonomous reliability enhancements in a device (e.g., as represented by communication apparatus 910) and a network (e.g., as represented by network apparatus 920) in accordance with various implementations of the present disclosure.

In some implementations, communication apparatus 910 may also include a transceiver 916 coupled to processor 912 and capable of wirelessly transmitting and receiving data. In some implementations, transceiver 916 may be capable of wirelessly communicating with different types of wireless networks of different radio access technologies (RATs). In some implementations, transceiver 916 may be equipped with a plurality of antenna ports (not shown) such as, for example, four antenna ports. That is, transceiver 916 may be equipped with multiple transmit antennas and multiple receive antennas for multiple-input multiple-output (MIMO) wireless communications. In some implementations, network apparatus 920 may also include a transceiver 926 coupled to processor 922. Transceiver 926 may include a transceiver capable of wirelessly transmitting and receiving data. In some implementations, transceiver 926 may be capable of wirelessly communicating with different types of UEs/wireless networks of different RATs. In some implementations, transceiver 926 may be equipped with a plurality of antenna ports (not shown) such as, for example, four antenna ports. That is, transceiver 926 may be equipped with multiple transmit antennas and multiple receive antennas for MIMO wireless communications.

In some implementations, communication apparatus 910 may further include a memory 914 coupled to processor 912 and capable of being accessed by processor 912 and storing data therein. In some implementations, network apparatus 920 may further include a memory 9224 coupled to processor 922 and capable of being accessed by processor 922 and storing data therein. Each of memory 914 and memory 924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 914 and memory 924 may include a type of read-only memory (ROM) such as mask ROM, programmable ROM (PROM), erasable programmable ROM (EPROM) and/or electrically erasable programmable ROM (EEPROM). Alternatively, or additionally, each of memory 914 and memory 924 may include a type of non-volatile random-access memory (NVRAM) such as flash memory, solid-state memory, ferroelectric RAM (FeRAM), magnetoresistive RAM (MRAM) and/or phase-change memory. Alternatively, or additionally, each of memory 914 and memory 924 may include a UICC.

Under certain proposed schemes in accordance with the present disclosure with respect to tiered channel information feedback framework in mobile communications, processor 912 may determine a first tier CSI based on a first reference signal resource measurement. Processor 912 may report, via transceiver 916, the first tier CSI to network apparatus 920. Processor 912 may determine a second tier CSI based on the first tier CSI and based on a second reference signal resource measurement. Processor 912 may report, via the transceiver 916, the second tier CSI to network apparatus 920. The second tier CSI may be different from the first tier CSI. Processor 912 may report the second tier CSI more frequently than the first tier CSI.

In some implementations, the first tier CSI or the second tier CSI may comprise a first subset of channel parameters including at least one basis selection in at least one of a spatial domain, a frequency domain and a Doppler domain.

In some implementations, the second tier CSI may comprise a second subset of channel parameters including at least one linear combination coefficient associated with the basis selection of the first tier CSI.

In some implementations, the first tier CSI or the second tier CSI may comprise a layer indicator indicating a strongest spatial layer among reported spatial layers.

In some implementations, processor 912 may determine a third tier CSI based on the first tier CSI and the second tier CSI and based on a third reference signal resource measurement. Processor 912 may report, via the transceiver 916, the third tier CSI to network apparatus 920. The third tier CSI may be different from the second tier CSI. Processor 912 may report the third tier CSI more frequently than the second tier CSI.

In some implementations, processor 912 may report the first tier CSI or the second tier CSI periodically, semi-periodically or aperiodically.

In some implementations, the reporting of the first tier CSI, the second tier CSI or the third tier CSI is triggered by the network node or triggered by the apparatus.

In some implementations, the first tier CSI and the second tier CSI are used to reconstruct channel response coefficients in at least one of the spatial domain, the frequency domain and the Doppler domain, or to reconstruct at least one preferred precoder over at least one of the spatial domain, the frequency domain and the Doppler domain.

In some implementations, the first tier CSI or the second tier CSI may comprise at least one of a CQI, an RI and a PMI.

In some implementations, processor 912 may determine a UCI format for the reporting according to a payload size of the first tier CSI or the second tier CSI.

Illustrative Processes

Figure 10:
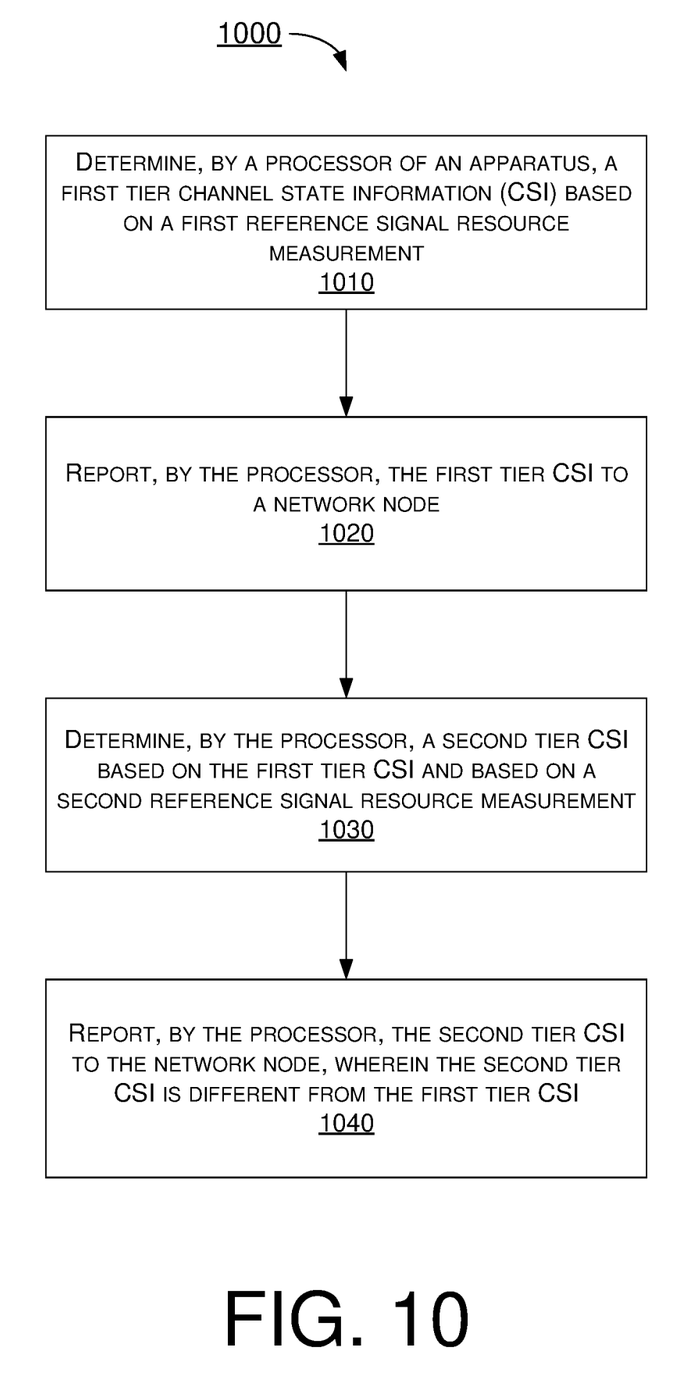
FIG. 10 is a flowchart of an example process in accordance with an implementation of the present disclosure.

FIG. 10 illustrates an example process 1000 in accordance with an implementation of the present disclosure. Process 1000 may be an example implementation of above scenarios/schemes, whether partially or completely, with respect to tired CSI feedback framework with the present disclosure. Process 1000 may represent an aspect of implementation of features of communication apparatus 910. Process 1000 may include one or more operations, actions, or functions as illustrated by one or more of blocks 1010, 1020, 1030 and 1040. Although illustrated as discrete blocks, various blocks of process 1000 may be divided into additional blocks, combined into fewer blocks, or eliminated, depending on the desired implementation. Moreover, the blocks of process 1000 may be executed in the order shown in FIG. 10 or, alternatively, in a different order. Process 1000 may be implemented by communication apparatus 910 or any suitable UE or machine type devices. Solely for illustrative purposes and without limitation, process 1000 is described below in the context of communication apparatus 910. Process 1000 may begin at block 1010.

At 1010, process 1000 may involve processor 912 of communication apparatus 910 determining a first tier CSI based on a first reference signal resource measurement. Process 1000 may proceed from 1010 to 1020.

At 1020, process 1000 may involve processor 912 reporting the first tier CSI to a network node. The receiving domain may comprise an antenna port or a spatial layer. Process 1000 may proceed from 1020 to 1030.

At 1030, process 1000 may involve processor 912 determining a second tier CSI based on the first tier CSI and based on a second reference signal resource measurement. Process 1000 may proceed from 1030 to 1040.

At 1040, process 1000 may involve processor 912 reporting the second tier CSI to the network node. The second tier CSI may be different from the first tier CSI. The second tier CSI may be reported more frequently than the first tier CSI.

In some implementations, the first tier CSI or the second tier CSI may comprise a first subset of channel parameters including at least one basis selection in at least one of a spatial domain, a frequency domain and a Doppler domain.

In some implementations, the second tier CSI may comprise a second subset of channel parameters including at least one linear combination coefficient associated with the basis selection of the first tier CSI.

In some implementations, the first tier CSI or the second tier CSI may comprise a layer indicator indicating a strongest spatial layer among reported spatial layers.

In some implementations, process 1000 may involve processor 912 determining a third tier CSI based on the first tier CSI and the second tier CSI and based on a third reference signal resource measurement. Process 1000 may further involve processor 912 reporting the third tier CSI to the network node. The third tier CSI may be different from the second tier CSI. The third tier CSI may be reported more frequently than the second tier CSI.

In some implementations, the first tier CSI or the second tier CSI may be reported periodically, semi-periodically or aperiodically.

In some implementations, the reporting of the first tier CSI or the second tier CSI may be triggered by the network node or triggered by the communication apparatus 910.

In some implementations, the first tier CSI and the second tier CSI may be used to reconstruct channel response coefficients in at least one of the spatial domain, the frequency domain and the Doppler domain, or to reconstruct at least one preferred precoder over at least one of the spatial domain, the frequency domain and the Doppler domain.

In some implementations, the first tier CSI or the second tier CSI may comprise at least one of a CQI, an RI and a PMI.

In some implementations, process 1000 may involve processor 912 determining a UCI format for the reporting according to a payload size of the first tier CSI or the second tier CSI.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of an apparatus, a first tier channel state information (CSI) based on a first reference signal resource measurement;
    reporting, by the processor, the first tier CSI to a network node;
    determining, by the processor, a second tier CSI based on the first tier CSI and based on a second reference signal resource measurement;
    reporting, by the processor, the second tier CSI to the network node;
    determining, by the processor, a third tier CSI based on the first tier CSI and the second tier CSI and based on a third reference signal resource measurement; and
    reporting, by the processor, the third tier CSI to the network node,
    wherein the second tier CSI is different from the first tier CSI, and
    wherein the third tier CSI is different from the second tier CSI.

2. The method of claim 1, wherein the first tier CSI or the second tier CSI comprises a first subset of channel parameters including at least one basis selection in at least one of a spatial domain, a frequency domain and a Doppler domain.

3. The method of claim 2, wherein the second tier CSI comprises a second subset of channel parameters including at least one linear combination coefficient associated with the basis selection of the first tier CSI.

4. The method of claim 1, wherein the first tier CSI or the second tier CSI comprises a layer indicator indicating a strongest spatial layer among reported spatial layers.

5. The method of claim 1, wherein the first tier CSI or the second tier CSI is reported periodically, semi-periodically or aperiodically.

6. The method of claim 1, wherein the reporting is triggered by the network node or triggered by the apparatus.

7. The method of claim 3, wherein the first tier CSI and the second tier CSI are used to reconstruct channel response coefficients in at least one of the spatial domain, the frequency domain and the Doppler domain, or to reconstruct at least one preferred precoder over at least one of the spatial domain, the frequency domain and the Doppler domain.

8. The method of claim 1, wherein the first tier CSI or the second tier CSI comprises at least one of a Channel Quality Indicator (CQI), a Rank Indicator (RI) and a Precoding Matrix Indicator (PMI).

9. The method of claim 1, further comprising:
    determining, by the processor, an uplink control information (UCI) format for the reporting according to a payload size of the first tier CSI or the second tier CSI.

10. An apparatus, comprising:
    a transceiver which, during operation, wirelessly communicates with at least one network node; and
    a processor communicatively coupled to the transceiver such that, during operation, the processor performs operations comprising:
        determining a first tier channel state information (CSI) based on a first reference signal resource measurement;
        reporting, via the transceiver, the first tier CSI to the network node;
        determining a second tier CSI based on the first tier CSI and based on a second reference signal resource measurement; and
        reporting, via the transceiver, the second tier CSI to the network node,
    wherein the second tier CSI is different from the first tier CSI,
    wherein the first tier CSI or the second tier CSI comprises a first subset of channel parameters including at least one basis selection in at least one of a spatial domain, a frequency domain and a Doppler domain,
    wherein the second tier CSI comprises a second subset of channel parameters including at least one linear combination coefficient associated with the basis selection of the first tier CSI, and
    wherein the first tier CSI and the second tier CSI are used to reconstruct channel response coefficients in at least one of the spatial domain, the frequency domain and the Doppler domain, or to reconstruct at least one preferred precoder over at least one of the spatial domain, the frequency domain and the Doppler domain.

11. The apparatus of claim 10, wherein the first tier CSI or the second tier CSI comprises a layer indicator indicating a strongest spatial layer among reported spatial layers.

12. The apparatus of claim 10, wherein, during operation, the processor further performs operations comprising:
   determining a third tier CSI based on the first tier CSI and the second tier CSI and based on a third reference signal resource measurement; and
   reporting, via the transceiver, the third tier CSI to the network node,
   wherein the third tier CSI is different from the second tier CSI.

13. The apparatus of claim 10, wherein the first tier CSI or the second tier CSI is reported periodically, semi-periodically or aperiodically.

14. The apparatus of claim 10, wherein the reporting is triggered by the network node or triggered by the apparatus.

15. The apparatus of claim 10, wherein the first tier CSI or the second tier CSI comprises at least one of a Channel Quality Indicator (CQI), a Rank Indicator (RI) and a Precoding Matrix Indicator (PMI).

16. The apparatus of claim 10, wherein, during operation, the processor further performs operations comprising:
   determining an uplink control information (UCI) format for the reporting according to a payload size of the first tier CSI or the second tier CSI.

\* \* \* \* \*